United States Patent [19]

Grossman

[11] 3,742,367
[45] June 26, 1973

[54] NON-DESTRUCTIVE DETECTION PROCESS FOR NUCLEAR FUEL RODS

[75] Inventor: Leonard N. Grossman, Livermore, Calif.

[73] Assignee: General Electric Company, San Jose, Calif.

[22] Filed: Sept. 22, 1970

[21] Appl. No.: 74,470

[52] U.S. Cl. .................................. 250/391, 176/68
[51] Int. Cl. .............................................. G01t 3/00
[58] Field of Search ..................... 250/83.1; 176/68

[56] References Cited
UNITED STATES PATENTS

| | | | |
|---|---|---|---|
| 1,151,160 | 8/1915 | Brown | 75/177 |
| 3,141,830 | 7/1964 | Klepfer et al. | 176/68 |
| 3,436,538 | 4/1969 | Basdekas | 250/83.1 |

FOREIGN PATENTS OR APPLICATIONS

| 138,348 | 4/1921 | Great Britain |
|---|---|---|

OTHER PUBLICATIONS

Detection Of Titanium Hydride By Neutron Radiography, By Hagemaier et al., From Materials Evaluation, Sept. 1969; pgs. 193–198.

*Primary Examiner*—Archie R. Borchelt
*Attorney*—Ivor J. James, Jr., Samuel E. Turner, Sam E. Laub, Frank L. Neuhauser, Oscar B. Waddell and Joseph B. Forman

[57] ABSTRACT

A method of detecting moisture and reactive gases in assembled nuclear fuel rods is disclosed in which an alloy of zirconium, nickel and titanium is added to the fuel rod. The fuel rod is uniformly heated for a sufficient time to vaporize moisture in the fuel rod enabling reaction between the alloy and the moisture and reactive gases. The presence of reaction products containing hydrogen can be detected by neutron radiography.

10 Claims, No Drawings

NON-DESTRUCTIVE DETECTION PROCESS FOR NUCLEAR FUEL RODS

BACKGROUND OF THE INVENTION

This invention relates to a non-destructive method of detecting moisture and reactive gases in nuclear fuel rods and in addition relates to to eliminating moisture and reactive gases found in assembled nuclear fuel rods.

Nuclear reactors are presently being designed, constructed and operated in which the nuclear fuel is contained in fuel elements which may have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator if present or both. Common cladding materials are stainless steel, aluminum and its alloys, zirconium and its alloys, niobium (columbium), certain magnesium alloys, and others. The failure of the cladding, due to the build-up of gas pressure or high temperatures in the fuel, can contaminate the coolant or moderator and the associated systems with intensely radioactive long-lived products to a degree which interferes with plant operation.

Problems have been encountered in the manufacture and in the operation of nuclear fuel elements which employ certain metals and alloys as the clad material due to the reactivity of these materials under certain circumstances. Zirconium and its alloys, under normal circumstances, are excellent materials as a nuclear fuel cladding since they have low neutron absorption cross sections and at temperatures below about 600°F are extremely stable and non-reactive in the presence of demineralized water or steam which are commonly used as reactor coolants and moderators. Within the confines of a sealed fuel rod, however, the hydrogen gas generated by the slow reaction between the cladding and residual water may build up to levels which under certain conditions can result in localized hydriding of the alloy with concurrent deterioration in the mechanical properties of the alloy. The cladding is also adversely affected by such gases as oxygen, nitrogen, carbon monoxide and carbon dioxide at all temperatures.

The zirconium alloy cladding commonly used in a nuclear fuel element is exposed to one or more of the gases given above during irradiation in a nuclear reactor in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and others used as nuclear fuel, release measurable quantities of the aforementioned gases upon heating, such as during fuel element manufacture or especially during irradiation. These gases react with zirconium alloy clad material containing the nuclear fuel. This reaction can result in the embrittlement of the cladding which endangers the integrity of the fuel element. Although water and water vapor may not react directly to produce this result, at high temperatures water vapor does not react directly to produce this result, at high temperatures water vapor does react with zirconium and zirconium alloys to produce hydrogen and this gas further reacts locally with the zirconium and zirconium alloys to cause embrittlement. These undesirable results are exaggerated by the release of these residual gases within the sealed metal-clad fuel element since it increases the internal pressure within the element and thus introduces stresses not anticipated in the original design of the clad tube.

In light of the foregoing, it has been desirable to eliminate water, water vapor and gases reactive with the cladding from the interior of the cladding throughout the time the nuclear fuel is used in the operation of nuclear power plants. One such approach has been to find materials which will chemically react with the water, water vapor and gases to eliminate these from the interior of the cladding, which materials are called moisture getters. While several getters for water and water vapor have been found, an especially desirable getter for water, water vapor and reactive gases such as hydrogen, carbon monoxide, carbon dioxide, nitrogen and oxygen has been developed and is the subject of U.S. Pat. application, Ser. No. 74,471, filed of even date with this invention in the names of L. N. Grossman and D. R. Packard and assigned to the assignee of this invention.

SUMMARY OF THE INVENTION

The alloys of the Grossman and Packard invention have now made possible a non-destructive detection process for water, water vapor, hydrogen and hydrogen-containing impurities in nuclear fuel rods using neutron radiography. In addition, this alloy enables a heating step to be conducted on fuel rods containing water, water vapor, hydrogen and hydrogen-containing impurities so that the alloys reacts with these undesirable constituents in the fuel rod before the fuel rod is used in a nuclear reactor.

It is an object of this invention to provide a non-destructive method for determining the presence of water and water vapor in assembled nuclear fuel rods prior to use of the nuclear fuel rods in a reactor.

It is another object of this invention to provide a non-destructive method for determining the presence of hydrogen and hydrogen-containing impurities in assembled nuclear fuel rods prior to use of the nuclear fuel rods in a reactor.

It is still another object of this invention to eliminate the moisture and reactive gases in clad nuclear fuel assemblies containing such undesirable constituents prior to utilization of these assemblies in nuclear reactors at high temperatures.

It is another object of this invention to utilize a three component alloy of zirconium, nickel and titanium which is a getter for water, water vapor and reactive gases in assembled nuclear fuel rods in a non-destructive detection process.

A further object of this invention is to provide a method of quality control of assembled fuel rods with respect to moisture content involving introducing an additive of the alloys disclosed in this invention to the fuel rod and uniformly heating the fuel rods to vaporize the moisture enabling reaction between the alloy and the moisture followed by examination of the fuel rod by neutron radiography.

DETAILED DESCRIPTION OF THE INVENTION

It has been discovered that water, water vapor, hydrogen and hydrogen-containing impurities can be detected in assembled nuclear fuel rods by adding an alloy having the essential components of zirconium, nickel and titanium, assembling the fuel rod, uniformly heating the assembled fuel rod for a sufficient time to vaporize moisture in the assembled fuel rod enabling reaction between the alloy and the moisture and reactive gases, and then examining the assembled fuel rod by neutron radiography. If moisture and hydrogen are detected in the fuel rod, the fuel rod has been heated for sufficient time to insure complete gettering of the moisture by the alloy.

A material suitable for controlling moisture by chemically combining with water and water vapor, herein called a getter, should have a combination of properties. One desirable property is the minimization of any free hydrogen after the chemical reaction of the getter with water to prevent hydride failures of metal components associated with the getter. Thus the getter should react stoichiometrically with the water and water vapor leaving no net source of hydrogen from the reaction. The getter should also rapidly react with the water at the temperatures prevailing in the nuclear fuel rod in which the getter is utilized, which would be in the range of about 200° to about 650°C. The getter should also have a low neutron cross section and be inexpensive to fabricate. Preferably the getter should also have the property of reacting with hydrogen, other gases such as carbon monoxide, carbon dioxide, oxygen and nitrogen, and hydrogen-containing compounds such as hydrocarbons.

The foregoing properties are embodied in a class of alloys having the essential components zirconium, nickel and titanium, particularly those alloys containing from about 3 to about 12 weight percent nickel, from about 3 to about 30 weight percent titanium with the balance being zirconium. Especially preferred alloy compositions are (1) 4 weight percent nickel, 11 weight percent titanium and the balance zirconium and (2) 12 weight percent nickel, 11 weight percent titanium and the balance zirconium. The alloys can be classified as zirconium base alloys. The composition ranges given above with the proper fabrication history produce alloys having at least 0.5 volume percent of an intermetallic nickel-containing phase. Representative of the intermetallic nickel-containing phases in the alloy are $NiZr_2$ and $Ni(0.9 Zr, 0.1 Ti)_2$. The alloys have a metallic appearance and metallographic examination shows the alloys are medium grained having an average grain size of about 10 micrometers.

The impurity content of the alloys is not critical to the development of the foregoing properties and substantial amounts of impurities can be included in the fabricated alloys as long as the surface of the alloys has the zirconium-nickel-titanium ternary exposed for reaction. In practice it has been discovered that oxygen contents up to several thousand parts per million in the alloys are tolerable. Nitrogen contents up to about 750 parts per million are tolerable and even desirable in utilization of the alloys as moisture getters. The other impurities found in the ternary alloys of this invention which do not hinder use of the alloys as getters include hydrogen and carbon. Metallic impurities in the alloy which do not hinder use of the alloys as getters are hafnium in amounts up to about 10,000 parts per million, iron in amounts up to about 1,100 parts per million, and chromium in amounts up to about 1,000 parts per million. The fact that the impurity content of the alloys is not critical to the utilization of the alloys as moisture getters enables fabrication of the alloy from low-grade components of nickel, titanium and zirconium having impurity contents. An example would be using impure zirconium available from a zirconium production facility for the cost advantage over highly refined zirconium. Depending on the position of the getter in the fuel rod, it may be necessary to minimize the impurities having a high neutron absorption cross section such as hafnium. If the alloys can be positioned so there is no interference with the nuclear function of the rod, then high neutron cross section impurities are tolerable.

Several production techniques can be practiced to produce the alloys used in this invention.

In one practice, the alloy was arc melted in controlled atmosphere arc melting furnaces. In preparation for the arc melting, a crystalline zirconium bar was cut into sections of convenient size, with one convenient size weighing about 100 grams. Small holes were drilled into the zirconium sections for introducing the alloying elements. After introduction of the alloying elements, the sections were pickled in a dilute acid solution followed by rinsing and drying. Before arc melting, the chamber of the arc melting furnace was evacuated and filled with an inert gas such as argon. A metallic getter such as a sacrificial zirconium getter button was melted in the furnace before melting the sections to clean the atmosphere further. The sections were then melted on first one side, allowed to solidify and then melted on the other side. This procedure was repeated until each alloy was homogenous.

After arc melting, the resulting alloy buttons can be fabricated by heating in an inert atmosphere and rapidly hot-rolled in air to a desired thickness. The sheets of alloy are then cleaned with a typical cycle of sandblasting, pickling in acid, rinsing in water and drying. If the sheets of alloy are found to be inhomogenous, the sheets are cut into small pieces, remelted in the arc furnace followed by rapidly hot rolling in air. Where the alloys are too reactive to hot roll in air and an inert atmosphere rolling facility is unavailable, the alloys are clad in copper before hot rolling.

Another method of fabricating the alloys used in this invention is to take a zirconium-titanium sheet material in proportions desired for the resulting alloy and nickel plate the nickel constituent onto the zirconium-titanium alloy. The nickel plated zirconium-titanium alloy is then subjected to a vacuum diffusion process to diffuse the nickel into the zirconium-titanium alloy, a representative process being done at 750°C. Since the diffusion of nickel usually achieves a depth of 0.6 mil in this representative process, thin sheets of the zirconium-titanium alloy are used in this process.

The alloys used in this invention have the property of reacting with moisture for long periods at a rapid rate of reaction over a temperature range of about 200° to about 650°C without becoming passive. One measured reaction rate was 1 to 2 micrograms/square centimeter of surface area per minute at about 300°C. The reaction data with water was obtained by heating alloy specimens in contact with water vapor, and the alloy exhibited no passivity for periods of greater than 30 hours. During reaction with water, the alloys allow substantially no release of hydrogen so metallic materials used in association with the alloys used in this invention would be exposed to substantially no hydrogen to form metallic hydrides leading to failures of the metallic materials. This minimum release of hydrogen during the reaction of the alloys with water indicates a substantially stoichiometric reaction of the alloys with the hydrogen and oxygen water. In addition, studies indicate that the alloys used in this invention readily react with hydrogen over a temperature range of about 200° to about 650°C so that the alloys used in this invention are efficient hydrogen getters. The alloys also react with hydrogen-containing compounds such as hydrocarbons and with other gases such as nitrogen, carbon dioxide, carbon monoxide and oxygen. Since the alloy is a zirconium base alloy, it has the low neutron cross-section required for use in nuclear applications and can be readily fabricated into shapes having high surface area such as thin sheets.

The properties exhibited by the class of alloys used in this invention enable utilization of the alloys as moisture and gas getters in nuclear fuel rods. Water-free ceramic fuel has been difficult to obtain because of the routine grinding of pellets under water and the exposure of the ceramic fuel to atmospheric humidity during assembly of nuclear fuel rods. Introduction of the alloys used in this invention into the coil of the coiled hold-down spring of the nuclear fuel rod provides protection from moisture and from hydriding failures of cladding. The success of these ternary alloys in nuclear fuel rods is attributable to the rapid rate of the stoichiometric reaction of the alloys with water and the fact that substantially no free hydrogen is produced in the reaction.

In the practice of the steps of this invention, a statistically selected sampling of nuclear fuel rods from a batch of fuel rods could be tested by uniformly heating the rods from about 200° to about 650°C for a time of from about one-tenth an hour to about 10 hours with longer heating time being used for heating at the lower temperatures. Neutron radiographic examination is then conducted on the portion of the fuel rod containing the alloy getter. Moisture will react with the alloy forming metallic hydrides which will show up as a dark area during neutron radiographic examination. Neutron radiographic transmission techniques can be utilized in the practice of this invention.

The invention is further described by the following example which is offered to be illustrative of the invention and does not serve to limit the invention in any manner.

EXAMPLE

Two Zircaloy-2 tubes six inches long and a half an inch in diameter were autoclaved in the presence of water to provide a protective oxide coating. The arrangement in the two tubes will be described from a vertical orientation. Sealed inside each tube toward the middle was a stainless steel stress mandrel which forms a transverse partition and divided each tube into two different parts leaving gas access between the two parts. The stress mandrel fits tightly with the Zircaloy tube. 100 milligrams of a 10 percent aqueous hydrogen fluoride solution were placed in the lower portion of each tube beneath the stress mandrel. About three inches of coiled 0.050 mil piano wire were placed in the upper portion of each tube above the stress mandrel with the piano wire contacting the stress mandrel. In one tube 4.76 grams of thin strips (0.7 mils in thickness) of a zirconium base getter alloy as used in this invention are placed inside the coiled piano wire so that the piano wire holds the strips. The alloy has a composition of 13.4 percent titanium by weight, 11.6 percent nickel by weight and the balance is zirconium. No alloy getter was introduced in the other tube. The tubes were sealed at both ends with fusion welded Zircaloy-2 end caps. The two tubes were simultaneously heated in vacuum to 290°C and held at that temperature for seven days followed by cooling to room temperature. The disposition of the hydrogen evolved from the hydrogen fluoride solution during the heating cycle was determined by neutron radiography. The tube containing the alloy strips showed hydrogen present only in the alloy strips whereas the tube without the alloy showed evidence of massive hydriding of the Zircaloy-2 walls of the tube in the vicinity of the stress mandrel and toward the end of the tube which holds the aqueous hydrogen fluoride solution. Heating hydrogen fluoride gives hydrogen available for rapid reaction with the Zircaloy-2 alloy as can be encountered from water vapor in a sealed fuel rod.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. The method of detecting moisture, hydrogen and hydrogen-containing impurities in assembled nuclear fuel rods comprising the steps of
    a. adding an alloy consisting essentially of zirconium, nickel and titanium to the fuel rod before assembly,
    b. assembling the fuel rod to form a gas tight enclosure,
    c. uniformly heating the assembled fuel rod for a sufficient time to vaporize moisture in the assembled rod enabling reaction between the alloy and the moisture, hydrogen and hydrogen-containing impurities, and
    d. examining the portion of the assembled fuel rod containing the alloy by neutron radiography for detection of metallic hydrides formed from reaction of the alloy with a source of hydrogen.

2. The method according to claim 1 in which the heating step is performed at a temperature in the range of about 200° to about 650°C.

3. The method according to claim 2 in which the heating step is performed at a temperature of about 400°C.

4. The method according to claim 1 in which the alloy has from about 3 to about 12 weight percent nickel, from about 3 to about 30 weight percent titanium and the balance is zirconium.

5. The method according to claim 4 in which the alloy has a nickel content of about 4 weight percent and a titanium content of about 11 weight percent.

6. The method according to claim 4 in which the alloy has a nickel content of about 12 weight percent and a titanium content of about 11 weight percent.

7. The method according to claim 1 in which the heating step is performed for a time period of about one-tenth of an hour to about 10 hours.

8. The method according to claim 1 in which the alloy is fabricated into sheet form.

9. The method according to claim 8 in which the sheet form of the alloy is in thin strips positioned in a coil of a coil hold-down spring in the fuel rod.

10. The method according to claim 1 in which the examination by neutron radiography is conducted using neutron radiographic transmission.

* * * * *

UNITED STATES PATENT OFFICE
CERTIFICATE OF CORRECTION

Patent No. 3,742,367            Dated   26 June 1973

Inventor(s) L. N. Grossman

It is certified that error appears in the above-identified patent and that said Letters Patent are hereby corrected as shown below:

Column 2, lines 8,9,10 "not react directly to produce this result, at high temperatures water vapor does" should be omitted. Column 5, line 14, after "hydrogen and oxygen" insert --components of--.

Signed and sealed this 5th day of November 1974.

(SEAL)
Attest:

McCOY M. GIBSON JR.
Attesting Officer

C. MARSHALL DANN
Commissioner of Patents